United States Patent
Jehle

(10) Patent No.: US 10,053,084 B2
(45) Date of Patent: Aug. 21, 2018

(54) METHOD FOR CONTROLLING AT LEAST ONE FIRST DRIVE UNIT OF A VEHICLE AS A FUNCTION OF OPERATING STATES OF A SECOND DRIVE UNIT OF THE VEHICLE DURING A SWITCHOVER OPERATION, AND CONTROL DEVICE

(71) Applicant: CONTINENTAL AUTOMOTIVE GMBH, Hannover (DE)

(72) Inventor: Martin Jehle, Lappersdorf (DE)

(73) Assignee: Continental Automotive GmbH, Hannover (DE)

( * ) Notice: Subject to any disclaimer, the term of this patent is extended or adjusted under 35 U.S.C. 154(b) by 63 days.

(21) Appl. No.: 15/028,482

(22) PCT Filed: Oct. 7, 2014

(86) PCT No.: PCT/EP2014/071432
§ 371 (c)(1),
(2) Date: Jun. 24, 2016

(87) PCT Pub. No.: WO2015/052180
PCT Pub. Date: Apr. 16, 2015

(65) Prior Publication Data
US 2016/0297426 A1    Oct. 13, 2016

(30) Foreign Application Priority Data
Oct. 10, 2013   (DE) .................. 10 2013 220 428

(51) Int. Cl.
| | |
|---|---|
| G05D 1/00 | (2006.01) |
| B60W 20/40 | (2016.01) |
| B60W 10/06 | (2006.01) |
| B60W 10/08 | (2006.01) |
| F02D 29/02 | (2006.01) |

(Continued)

(52) U.S. Cl.
CPC ............... *B60W 20/40* (2013.01); *B60K 6/48* (2013.01); *B60W 10/06* (2013.01); *B60W 10/08* (2013.01);
(Continued)

(58) Field of Classification Search
CPC ...... B60W 10/20; B60W 10/22; B60W 30/02; B60W 40/09; B60W 2050/20; B60K 17/00; B60K 23/00; B60K 25/00
(Continued)

(56) References Cited

U.S. PATENT DOCUMENTS

| | | | | |
|---|---|---|---|---|
| 6,487,998 B1 * | 12/2002 | Masberg | ................. | B60L 7/003 123/192.1 |
| 7,286,040 B2 * | 10/2007 | Karabinis | .............. | G01D 21/00 340/10.1 |

(Continued)

FOREIGN PATENT DOCUMENTS

| | | |
|---|---|---|
| DE | 19532128 A1 | 3/1997 |
| DE | 102009027603 A1 | 1/2011 |

(Continued)

OTHER PUBLICATIONS

Derwent, Oct. 2012, Derwent, Huang et al.*

*Primary Examiner* — Muhammad Shafi
(74) *Attorney, Agent, or Firm* — Laurence A. Greenberg; Werner H. Stemer; Ralph E. Locher

(57) ABSTRACT

A method for controlling at least one first drive unit of a vehicle as a function of operating states of a second drive unit of the vehicle during a switchover operation. The first drive unit is associated with a first control unit and the second drive unit s associated with a second control unit. At least one message is transmitted to the first control unit by the second control unit. The message includes: a first desired value TQ1 of a controlled variable prior to the switchover
(Continued)

operation; a second desired value TQ2 of the controlled variable after the switchover operation; and information on the angular position of a shaft of the second drive unit at the projected point of time of the switchover operation.

18 Claims, 1 Drawing Sheet

(51) Int. Cl.
  *B60K 6/48* (2007.10)
  *F02D 13/02* (2006.01)
  *F02D 17/02* (2006.01)
  *B60W 50/00* (2006.01)
(52) U.S. Cl.
  CPC ..... *F02D 29/02* (2013.01); *B60W 2050/0006* (2013.01); *B60W 2050/0088* (2013.01); *B60W 2510/0638* (2013.01); *B60W 2510/0685* (2013.01); *B60W 2510/081* (2013.01); *B60W 2710/0666* (2013.01); *B60W 2710/083* (2013.01); *B60Y 2200/92* (2013.01); *B60Y 2300/188* (2013.01); *F02D 13/0207* (2013.01); *F02D 17/02* (2013.01); *Y02T 10/6221* (2013.01); *Y02T 10/6286* (2013.01); *Y10S 903/93* (2013.01)
(58) Field of Classification Search
  USPC ........ 701/22, 36, 41, 57, 58, 67, 70, 72, 79, 701/81–96; 180/65.1–65.8
  See application file for complete search history.

(56) References Cited

U.S. PATENT DOCUMENTS

| | | | | |
|---|---|---|---|---|
| 8,380,362 B2* | 2/2013 | Beavin | ................. | G05D 1/0044 342/450 |
| 8,639,409 B2* | 1/2014 | Ramaswamy | ............ | H02J 3/06 700/291 |
| 8,855,575 B2* | 10/2014 | Heines | ...................... | G06F 8/70 340/12.23 |
| 9,090,242 B2* | 7/2015 | Falkenstein | ........... | B60W 10/06 |
| 2007/0233332 A1* | 10/2007 | Kawada | ................. | B60K 6/365 701/13 |
| 2009/0229897 A1* | 9/2009 | Yutani | .................... | B60K 6/365 180/65.28 |
| 2011/0010022 A1* | 1/2011 | Beavin | ................. | G05D 1/0044 701/2 |
| 2012/0239237 A1* | 9/2012 | Hashimoto | ............ | B60K 6/365 701/22 |
| 2013/0085634 A1* | 4/2013 | Jinbo | .................... | B60W 10/02 701/22 |
| 2013/0255639 A1* | 10/2013 | Guillen Castillo | ... | B60W 10/08 123/472 |

FOREIGN PATENT DOCUMENTS

| | | | |
|---|---|---|---|
| JP | 2000-165313 | * | 6/2000 |
| JP | 2000165313 | * | 6/2000 |
| WO | 2012076561 A1 | | 6/2012 |

* cited by examiner

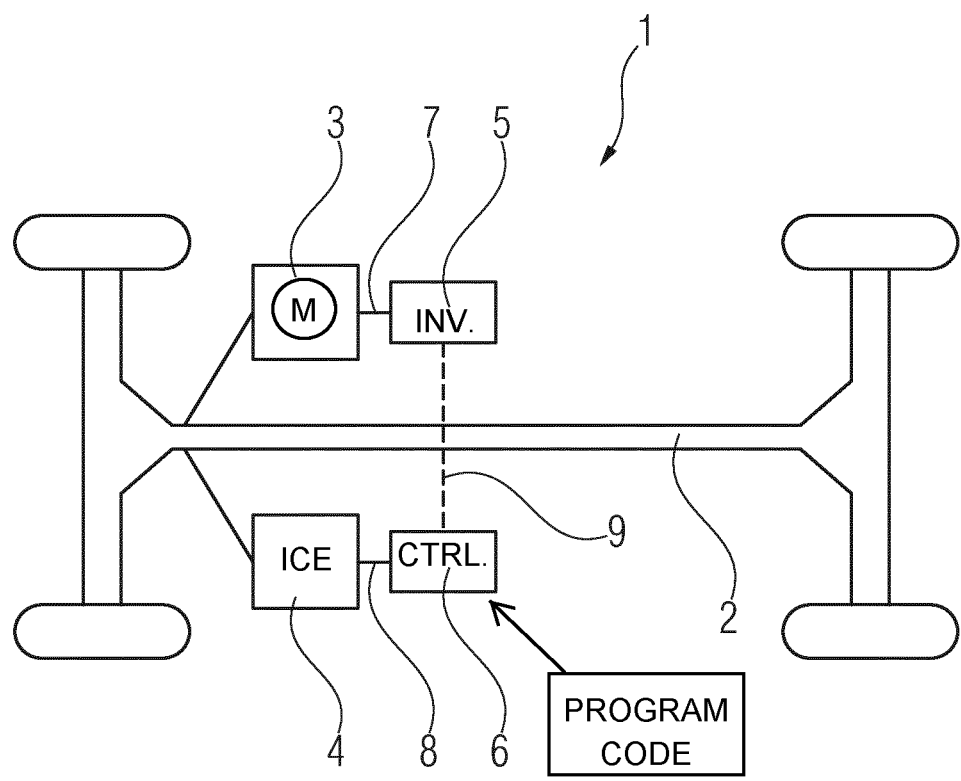

METHOD FOR CONTROLLING AT LEAST ONE FIRST DRIVE UNIT OF A VEHICLE AS A FUNCTION OF OPERATING STATES OF A SECOND DRIVE UNIT OF THE VEHICLE DURING A SWITCHOVER OPERATION, AND CONTROL DEVICE

BACKGROUND OF THE INVENTION

Field of the Invention

A method is proposed for controlling at least a first drive unit of a vehicle in dependence upon operating states of a second drive unit of the vehicle during a switchover operation. The method can be in particular a method for controlling a so-called parallel hybrid drive of a vehicle, wherein both a combustion engine and also at least one electric motor are provided as drive units and said units jointly influence the drive train.

In the case of arrangements of this type, it is possible to use the positive or negative torque, which is provided by the electric motor, so as to neutralize changes in the torque of the combustion engine during switchover operations (for example when controlling the strokes, deactivating the cylinders and in the combustion mode). By way of example, it is possible when switching from the high valve stroke into the low valve stroke to produce a positive torque of the electric motor in order to overcome the lack of torque whilst filling the intake pipe (de-throttling). It is possible in this manner to avoid the retardation of the ignition angle that was previously required in the case of Otto engines and any limitations such as the achievable ignition angle range can be overcome. It is likewise possible to use a negative torque of the electric motor (generator mode) in order to reduce any excess torque of the combustion engine.

Communication between the control unit that is allocated to the combustion engine and the control unit that is allocated to the at least one electric motor usually occurs in a fixed time pattern, by way of example in a 10 ms time pattern. However, when functions of the drive units are to be coordinated, in particular during switchover operations, this communication must occur in an angle-synchronized manner. It is however problematic by way of example to provide a compensating moment at a precise point in time if the communication occurs in a time-synchronous manner in a predetermined time pattern.

In contrast, the angle-synchronous transmission of data packets would be very costly and data packets could collide in the event that an exclusive communication bus is not available.

This problem is known from DE 10 2009 027 603 A1. For this purpose, a method is described, wherein at least one operating parameter from an operating range of at least one allocated drive unit is transmitted from at least one drive unit control unit to a supervisory control unit, wherein a desired operating point for the at least one drive unit is ascertained by the supervisory control unit on the basis of the received, at least one operating parameter, and wherein the ascertained desired operating point is transmitted together with the at least one operating parameter to the at least one drive unit control unit. It follows from this that a supervisory control unit is used that performs an adaptation of the closed-loop control procedure of the torques.

BRIEF SUMMARY OF THE INVENTION

It is the object of aspects of the invention to render it possible using technically simple means at a precise moment in time to compensate the torques in a system having at least one first drive unit and at least one second drive unit, in particular during switching procedures.

In accordance with one aspect of the invention, a method is proposed for controlling at least one first drive unit of a vehicle in dependence upon operating states of a second drive unit of the vehicle during a switchover operation, wherein a first control unit is allocated to the first drive unit and a second control unit is allocated to the second drive unit. The method includes transmitting at least one data packet from the second control unit to the first control unit, wherein the data packet includes the following:
- a first desired value TQ1 of a control variable prior to the switchover operation;
- a second desired value TQ2 of the control variable after the switchover operation;
- data regarding an angle position of a shaft of the second drive unit at the point in time of the planned switchover operation.

The first drive unit can be in particular an electric motor and the second drive unit can be in particular a combustion engine. The control variable can be in particular the provided torque. In the event that a switchover operation is not planned, TQ1 and TQ2 can thus have the same value.

In a different embodiment, the drive units can be two banks of a combustion engine that are operated using two control units in a master/slave configuration.

The data regarding the angle position include the crankshaft position (or a variable that relates to said crankshaft position in a known manner), at which a switchover from TQ1 to TQ2 is to be performed. This is ascertained by the second control unit from the impending switchover operations.

The method has the advantage that data regarding the angle is transmitted that defines the point in time of the switchover. It is possible in this manner to also ascertain the correct point in time of the switchover between the transmissions of time-synchronous data packets.

In one embodiment, the angle $\varphi_{switch}$ of the shaft of the second drive unit at the point in time of the planned switchover operation is transmitted as data regarding an angle position of the second drive unit at the point in time of the planned switchover operation.

In order that the first control unit, by way of example the inverter of an electric motor, can identify the point in time of the switchover with reference to data regarding the angle of the first drive unit, the relationship between the crankshaft angle $\varphi$ and the position $\vartheta$ of the first drive unit is produced.

For this purpose, the first control unit evaluates the following linear equation:

$$\varphi = \vartheta * K + \varphi_0.$$

If the value ascertained at the first control unit for $\varphi$ achieves the switchover angle $\varphi_{switch}$, then the first control unit switches from the desired value TQ1 to the desired value TQ2.

Furthermore, in one embodiment, the method therefore includes ascertaining an angle $\vartheta_{switch}$ of a shaft of the first drive unit at the point in time of the planned switchover operation by means of the first control unit, wherein the angle $\vartheta_{switch}$ is ascertained from:

$$\vartheta_{switch} = (\varphi_{switch} - \varphi_0)/K,$$

wherein $\varphi_0$ represents the angle offset of the shafts with respect to one another and K represents the rotational speed ratio of the first and second drive unit.

If the rotational speeds of the two drive units are fixedly coupled, such as by way of example in the case of a crankshaft starter generator, then it is possible to fixedly program the value for K. However, in the absence of a fixed coupling, by way of example in the case of the belt starter generator and the associated belt slippage, then this value can also be ascertained as described hereinunder.

In one embodiment, so as to ascertain the angle offset $\varphi_0$, the current angle $\varphi_{message}$ is transmitted to the first control unit and the current angle $\vartheta_{message}$ is stored, wherein the angle offset $\varphi_0$ is ascertained from:

$$\varphi_0 = \varphi_{message} - \vartheta_{message} * K.$$

Alternatively, the angle offset $\varphi_0$ can also be fixedly programmed if it does not change.

The angle $\varphi_{message}$ can be transmitted in the same data packet as the values TQ1, TQ2 and $\varphi_{switch}$. It is advantageous if, when sending the data packet, a value as current as possible is used for the angle.

Likewise, when receiving the data packet, a value as current as possible is likewise stored in order to achieve a high degree of accuracy.

In one embodiment, the angle offset $\varphi_0$ is adapted by means of repeating the ascertaining process. If the angle offset $\varphi_0$ is constant while the motor is running or for part of the motor running time, by way of example in the case of a rigid coupling between the two drive units or a fixedly closed coupling between said two drive units, then it is advantageous to adapt the angle offset in the case of low rotational speeds if angle errors occur in the time only result in a very small angle error. The value acquired in this manner can be used without disadvantages in the accuracy in the case of high rotational speeds.

In an alternative embodiment, the angle offset $\Delta\varphi_{switch}$ of the shaft of the second drive unit at the point in time of the planned switchover operation is transmitted as data regarding an angle position of the second drive unit at the time of the planned switchover operation, wherein the following applies: $\Delta\varphi_{switch} = \varphi_{switch} - \varphi_{message}$. The angle offset $\Delta\varphi_{switch}$ his accordingly the difference between the angle $\varphi_{switch}$ during the switchover and the current actual angle $\varphi_{message}$.

Also in the case of this embodiment, the first control unit can store the current actual value $\vartheta_{message}$ when receiving the data packet and ascertain from said value the angle $\vartheta$, wherein the following switchover is to be performed:

$$\vartheta_{switch} = \vartheta_{message} + \Delta\varphi/K.$$

If the actual angle $\vartheta$ of the first drive unit achieves the switchover angle $\vartheta_{switch}$, then the first control unit switches from the desired value TQ1 to the desired value TQ2.

In one embodiment, so as to ascertain K one after the other two actual values $\varphi_{message1}$ and $\varphi_{message2}$ of the angle of the shaft of the second drive unit are transmitted to the first control unit and the associated actual values $\vartheta_{message1}$ and $\vartheta_{message2}$ of the angle of the first drive unit are stored, wherein the rotational speed ratio K is ascertained from:

$$K = (\varphi_{message2} - \varphi_{message1})/(\vartheta_{message2} - \vartheta_{message1}).$$

In an alternative embodiment, so as to ascertain K data regarding the rotational speed $d\varphi/dt$ of the second drive unit are transmitted to the first control unit and the associated data regarding the rotational speed $d\vartheta/dt$ of the first drive unit are stored, wherein the rotational speed ratio K is ascertained from:

$$K = (d\varphi/dt)/(d\vartheta/dt).$$

In one embodiment, the rotational speed ratio K is adapted by means of repeating the ascertaining process. Consequently, it is possible to achieve a high degree of accuracy when ascertaining K.

In one embodiment of the method, the change in the control variable from its desired value TQ1 prior to the switchover operation to its desired value TQ2 after the switchover operation is prepared by virtue of the fact that the first control unit provides new desired values of the first drive unit prior to the point in time of the switchover.

This can be achieved by virtue of the fact that the first control unit knows the point in time of an impending switchover and also knows the subsequent following desired value TQ2 even some time prior to the switchover. It is therefore possible, even in the case of a predetermined angle prior to the switchover angle that is ascertained with the aid of the anticipated time delay, for example for the torque build-up, to begin providing the new desired values. As a consequence, it is achieved that the actual point in time of the desired value change easily corresponds as far as possible with the desired point in time of the switchover.

The method renders it possible to perform a torque compensation procedure at the optimal point in time, when the procedures concerned can be predicted over a specific time period. As a consequence, switchovers can be performed in a smoother and consequently more comfortable manner.

In accordance with one aspect of the invention, a computer program product is provided that comprises a computer-readable medium and program code that is stored on the computer-readable medium and that, when it is performed on a computing unit, instructs the computer unit to perform the described method.

The computing unit can be in particular a control unit at least of one drive unit.

In accordance with a further aspect of the invention, a control device for drive units of a vehicle is provided, said control device comprising the following:

a first control unit that is allocated to a first drive unit of the vehicle; a second control unit that is allocated to a second drive unit of the vehicle, a communication connection between the first control unit and the second control unit, wherein the control device is embodied in such a manner that during a switching operation a data packet is transmitted from the second control unit to the first control unit, wherein the data packet includes the following:

a first desired value TQ1 of the control variable prior to the switchover;

a second desired value TQ2 of the control variable after the switchover;

data regarding an angle position of a shaft of the second drive unit at the point in time of the planned switchover.

BRIEF DESCRIPTION OF THE DRAWING

Exemplary embodiments are further explained with reference to the drawing. The single FIGURE illustrates schematically a control unit in accordance with one embodiment of the invention for coordinating two drive units.

DESCRIPTION OF THE INVENTION

The figure illustrates schematically the drive train 2 of a vehicle, not further illustrated, and said drive train is embodied as a parallel hybrid system. A first drive unit 3 is provided that is embodied in the illustrated embodiment as an electric motor, and a second drive unit 4 that is embodied in the illustrated embodiment as a combustion engine. Both the combustion engine and also the electric motor provide torque and comprise a connection that transmits torque to the drive train 2.

The first drive unit 3 is allocated a first control unit 5 that in this embodiment is an inverter. The second drive unit 4 is allocated a second control unit 6. The control units 5, 6 are in each case connected to the drive units 3, 4 by way of signal lines 7, 8 and are part of a control device 1 for the drive units 3, 4.

A communication connection 9 by way of example a CAN-bus or a FlexRay-Bus is provided between the first control unit 5 and the second control unit 6.

The control device 1 is embodied in such a manner that during a switchover operation a data packet is transmitted from the second control unit 4 by way of the communication connection 9 to the first control unit 3, wherein the data packet comprises the first desired value TQ1 of the control variable prior to the switchover, the second desired value TQ2 of the control variable after the switchover and also data regarding an angle position of a shaft of the second drive unit 4 at the point in time of the planned switchover.

The control device 1 renders it possible to perform a compensation of the torque of the combustion engine by means of the electric motor if it is necessary to perform a compensation procedure during a switchover.

LIST OF REFERENCE NUMERALS

1 Control device
2 Drive train
3 First drive unit
4 Second drive unit
5 First control unit
6 Second control unit
7 Signal line
8 Signal line
9 Communication connection

The invention claimed is:

1. A method of controlling a first drive unit of a vehicle in dependence upon an operating state of a second drive unit of the vehicle during a switchover operation from the second drive unit to the first drive unit, the method comprising:
providing a first control unit operatively associated with the first drive unit and a second control unit operatively associated with the second drive unit, the first control unit controlling the first drive unit and the second control unit controlling the second drive unit by way of a control variable TQ having given desired values TQ1 and TQ2;
in preparation for the switchover operation, transmitting at least one data packet from the second control unit to the first control unit, the data packet including:
a first desired value TQ1 of a control variable prior to the switchover operation;
a second desired value TQ2 of the control variable after the switchover operation; and
data indicating an angular position of a shaft of the second drive unit at a point in time of the planned switchover operation;
effecting a change in the control variable from the value TQ1 prior to the switchover to the value TQ2 after the switchover by providing with the first control unit new desired values for the first drive unit prior to the switchover; and
defining a time instant for the switchover based on the value TQ2 and effecting the switchover between the first and second drive units at the defined time instant for the switchover by ceasing to drive the vehicle with the first drive unit and driving the vehicle with the second drive unit or ceasing to drive the vehicle with the second drive unit and driving the vehicle with the first drive unit.

2. The method according to claim 1, wherein the data regarding the angular position is an angle $\varphi_{switch}$ of the shaft of the second drive unit at the point in time of the planned switchover operation.

3. The method according to claim 2, which further comprises ascertaining an angle $\vartheta_{switch}$ of a shaft of the first drive unit at the point in time of the planned switchover operation by the first control unit, wherein the angle $\vartheta_{switch}$ is ascertained from:

$$\vartheta_{switch} = (\varphi_{switch} - \varphi_0)/K,$$

where $\varphi_0$ represents an angular offset between the shafts of the first and second drive units with respect to one another and K represents a ratio between a rotational speed of the first drive unit and a rotational speed of the second drive unit.

4. The method according to claim 3, which comprises, for determining the angular offset $\varphi_0$, transmitting a current angle $\varphi_{message}$ to the first control unit and storing a current angle a $\vartheta_{message}$, and ascertaining the angular offset $\varphi_0$ from:

$$\varphi_0 = \varphi_{message} - \vartheta_{message} * K.$$

5. The method according to claim 4, which comprises adapting the angular offset $\varphi_0$ by repeating the ascertaining step.

6. The method according to claim 3, which comprises ascertaining the ratio K by transmitting to the first control unit one after the other two actual values $\varphi_{message1}$ and $\varphi_{message2}$ of the angle of the shaft of the second drive unit and storing associated actual values $\vartheta_{message1}$ and $\vartheta_{message2}$ of the angle of the shaft of the first drive unit, and determining the ratio K of the rotational speeds from:

$$K = (\varphi_{message2} - \varphi_{message1})/(\vartheta_{message2} - \vartheta_{message1}).$$

7. The method according to claim 6, which comprises adapting the ratio K of the rotational speeds by repeating the ascertaining step.

8. The method according to claim 3, which comprises ascertaining the ratio K by transmitting data regarding the rotational speed $d\varphi/dt$ of the second drive unit to the first control unit and storing associated data regarding the rotational speed $d\vartheta/dt$ of the first drive unit, and determining the ratio K of the rotational speeds from:

$$K = (d\varphi/dt)/(d\vartheta/dt).$$

9. The method according to claim 8, which comprises adapting the ratio K of the rotational speeds by repeating the ascertaining step.

10. The method according to claim 1, wherein the data regarding the angular position of the shaft of the second drive unit is an angular offset $\Delta\varphi_{switch}$ of the shaft of the second drive unit at a point in time of the planned switchover operation, and wherein:

$$\Delta\varphi_{switch} = \varphi_{switch} - \varphi_{message}.$$

11. The method according to claim 10, which further comprises ascertaining an angle $\vartheta_{switch}$ of a shaft of the first drive unit at the point in time of the planned switchover by the first control unit, wherein the angle $\vartheta_{switch}$ is ascertained from:

$$\vartheta_{switch} = \vartheta_{message} - \Delta\varphi_{switch}/K,$$

wherein a $\vartheta_{message}$ represents the angle of the shaft of the first drive unit that is stored when the data packet is received by way of the first control unit and K represents a ratio between a rotational speed ratio of the first drive unit and a rotational speed of the second drive unit.

12. The method according to claim 10, which comprises ascertaining the ratio K by transmitting to the first control unit one after the other two actual values $\varphi_{message1}$ and $\varphi_{message2}$ of the angle of the shaft of the second drive unit and storing associated actual values $\vartheta_{message1}$ and $\vartheta_{message2}$ of the angle of the first drive unit, and determining the ratio K of the rotational speeds from:

$$K=(\varphi_{message2}-\varphi_{message1})/(\vartheta_{message2}-\vartheta_{message1}).$$

13. The method according to claim 11, which comprises adapting the ratio K of the rotational speeds by repeating the ascertaining step.

14. The method according to claim 10, which comprises ascertaining the ratio K by transmitting data regarding the rotational speed $d\varphi/dt$ of the second drive unit to the first control unit and storing associated data regarding the rotational speed $d\vartheta/dt$ of the first drive unit, and determining the ratio K of the rotational speeds from:

$$K=(d\varphi/dt)/(d\vartheta/dt).$$

15. The method according to claim 14, which comprises adapting the ratio K of the rotational speeds by repeating the ascertaining step.

16. The method according to claim 1, which comprises preparing a change in the control variable from the desired value TQ1 prior to the switchover operation to the desired value TQ2 after the switchover operation by providing with the first control unit new desired values of the first drive unit prior to the point in time of the switchover.

17. A computer program product, comprising a computer-readable medium and non-transitory program code stored on the computer-readable medium and configured, upon being executed on a computing unit, to instruct the computing unit to perform a
method of controlling a first drive unit of a vehicle in dependence upon a operating state of a second drive unit of the vehicle during a switchover operation from the second drive unit to the first drive unit, the method comprising:
using a first control unit operatively associated with the first drive unit and a second control unit operatively associated with the second drive unit, the first control unit controlling the first drive unit and the second control unit controlling the second drive unit by way of a control variable TQ having given desired values TQ1 and TQ2;
in preparation for the switchover operation, transmitting at least one data packet from the second control unit to the first control unit, the data packet including:
a first desired value TQ1 of a control variable prior to the switchover operation;
a second desired value TQ2 of the control variable after the switchover operation; and
data indicating an angular position of a shaft of the second drive unit at a point in time of the planned switchover operation;
effecting a change in the control variable from the value TQ1 prior to the switchover to the value TQ2 after the switchover by providing with the first control unit new desired values for the first drive unit prior to the switchover; and
defining a time instant for the switchover based on the value TQ2 and effecting the switchover between the first and second drive units at the defined time instant for the switchover by ceasing to drive the vehicle with the first drive unit and driving the vehicle with the second drive unit or ceasing to drive the vehicle with the second drive unit and driving the vehicle with the first drive unit.

18. A control device for drive units of a vehicle, the control device comprising:
a first control unit allocated to a first drive unit of the vehicle;
a second control unit allocated to a second drive unit of the vehicle;
said first and second control units being configured to control the first and second drive units, respectively, by way of a control variable TQ having given desired values TQ1 and TQ2;
a communication link between said first control unit and said second control unit,
wherein the control device is configured, during a switching operation at which an operation of the vehicle is switched from being driven by the first drive unit to being driven by the second drive unit or vice versa, to cause a data packet to be transmitted from the second control unit to the first control unit, the data packet including:
a first desired value TQ1 of a control variable prior to the switchover;
a second desired value TQ2 of the control variable after the switchover; and
data regarding an angular position of a shaft of the second drive unit at a point in time of the planned switchover; and
wherein the control device is configured to define the point in time of the planned switchover based on the angular position of the shaft of the second drive unit.

* * * * *